UNITED STATES PATENT OFFICE.

EDWARD W. HASLUP, OF BRONXVILLE, NEW YORK, ASSIGNOR TO GILCHRIST, HASLUP & PEACOCK, INC., OF NEW YORK, N. Y., A CORPORATION OF NEW YORK.

PROCESS OF MAKING MAGNESIUM CARBONITRID IN BLAST-FURNACES.

1,291,498.

Specification of Letters Patent. Patented Jan. 14, 1919.

No Drawing. Application filed August 9, 1918. Serial No. 249,118.

*To all whom it may concern:*

Be it known that I, EDWARD W. HASLUP, a citizen of the United States, residing at Bronxville, in the county of Westchester and State of New York, have invented certain new and useful Improvements in Processes of Making Magnesium Carbonitrid in Blast-Furnaces; and I do hereby declare the following to be a full, clear, and exact description of the invention, such as will enable others skilled in the art to which it appertains to make and use the same.

This invention relates to a process for fixing atmospheric nitrogen in a blast furnace and has for its object to provide a method which will be more expeditious and less costly than those heretofore proposed.

With this and other objects in view the invention consists in the novel steps and combinations of steps constituting the process, all as will be more fully hereinafter disclosed and particularly pointed out in the claims.

In order that the precise nature of the invention may be the more clearly understood it is said:—It is well known that when free or combined alkali metal oxids, or alkali earth metal oxids, capable of forming salts with acids are exposed to carbon and heated to a sufficiently high temperature in an atmosphere of nitrogen, free of oxidizing gases, such as oxygen, carbon dioxid, etc., that a nitrogen and carbon containing compound is formed which is, at its temperature of formation, volatile or at least has the physical properties of a sublimate.

Processes employing principles similar to this have been made the subjects of Patents #1134411; #1134412; and #1134413, each dated April 6, 1915, and issued to Samuel Peacock, as well as Patent #1156108, dated October 12, 1915, issued to Spencer *et al.* But, in following the procedure of the said Peacock patents, it is not only essential to remove the sublimed nitrogenous compound or carbo nitrid from a furnace chamber necessarily sealed from the air, to prevent destroying the compound, but the carbo nitrid values must be collected and cooled out of contact with the air, by some means, and to such a temperature as will preclude their decomposition upon contact with oxygen, and all in a continuous industrial operation.

Besides this, the cost of heat units generated in an electric furnace is much greater than those generated in a blast furnace, and further, it is well recognized that electric furnace processes are commercially very much more expensive than blast furnace processes.

In the case of the Spencer Patent #1156108, above mentioned, it is directed to a process for making cyanids not carbo nitrids or cyanamids, it prefers the presence of iron oxid in the charge which calls for the presence of carbon monoxid CO to reduce the same, and this reduction of course produces $CO_2$ gas which latter, of course, would destroy any cyanamids as fast as they are formed.

In these essential respects, the present invention differs from the said Spencer disclosure. But a still further difference resides in the fact that Spencer must return his withdrawn gases to his furnace or else he cannot produce his iron. The process made the subject of the present application, on the other hand, does not do this. It takes the gases from the furnace once and for all. In other words, carbon dioxid is desirable in the Spencer process, while it would be fatal in the present process. Iron oxid is desirable in the Spencer furnace, while it is to be avoided and is almost fatal in the present process.

The mechanical problem thus presented in carrying out an industrial procedure of this nature with a blast furnace is evidently a very difficult one. In practice all processes of this kind for nitrogen fixation have been limited in their operation to the use of electrically generated heat in one form or another, for electricity seemed to furnish the only means for readily obtaining the desired temperature in a sealed furnace or oven.

Hence it is obvious that a procedure which would enable the use of directly generated heat from coal in a nitrogen fixation process of this kind, would constitute an economic gain.

In my copending application #227316, filed Apr. 8, 1918, entitled "Process of recovering fixed nitrogen" I have described and claimed a process somewhat similar to the present, but in that application calcium oxid is specifically claimed. On the other hand, magnesium oxid presents many advantages over calcium oxid, among them a lower temperature is required in the furnace to fix the nitrogen, and another advantage resides in the fact that the atomic weight of magnesium is much less than the weight of calcium, and therefore, a pound of magnesium oxid will produce a greater weight of fixed nitrogen than will a pound of calcium oxid.

Accordingly, in carrying out this invention, I charge the furnace with magnesium oxid and coke, preferably in a briqueted condition, precisely as an iron blast furnace would be charged. In all cases I employ an excess of carbon over that theoretically required to produce the reaction and to produce the necessary heat in the furnace. This excess of carbon precludes the possibility of any carbon dioxid, $CO_2$, being present, and therefore, it insures the presence of a reducing atmosphere at all times in the furnace. Under ordinary conditions, the burned magnesite which supplies the magnesium oxid contains some small proportions of silica and alumina, and therefore, very little if any flux material will be required, but if the slag is not sufficiently molten, I may employ suitable fluxing materials.

The charge being properly proportioned, and a suitable excess of carbon, say from 40% to 60% being supplied, the blast is turned on and the temperature permitted to rise to about 1600° C. in order that the reaction velocity may be accelerated. The following main reaction will take place.

$$MgO + 2C + N_2 = MgCN_2 + CO$$

As clearly set forth in my copending application above, unless this magnesium carbonitrid is withdrawn from the region of the fusion zone, of the furnace, substantially as fast as it is formed it will ascend to the higher portions of the stack of the furnace and be decomposed. Accordingly, it is an important feature of this invention that the said magnesium carbo nitrid is withdrawn from the region of the fusion zone substantially as fast as it is formed.

By limiting the charge to magnesite which contains relatively small quantities of alumina, I am not bothered with the formation of aluminum carbo nitrids at the higher temperatures so I can accelerate the reaction at the said higher temperatures and thus produce larger quantities of fixed nitrogen. Stated in other language, since magnesium oxid in itself requires a relatively low temperature in order to fix the nitrogen, I am enabled by raising the temperature to 1600° C. to employ a high velocity reaction and thereby to produce a greater output with a given apparatus than would be possible in the use of calcium oxid.

Further, as no iron oxids are to be reduced in this process, no objection is encountered in tapping the furnace gases at a suitable point near the twyers or where the carbo nitrids are found to be the most concentrated, and this I do. Ordinarily such a point in a blast furnace is found to be at or in the region of the usual fusion zone. After the furnace gases have been thus led from the fusion zone they are carried out of contact with the air to any suitable scrubber or collector where the carbo nitrids contained therein are cooled down to a point where contact with the air does not affect them, and they are then recovered without substantial loss.

Of course, it is understood that nitrogen which is fixed by the magnesium present is introduced into the furnace as a part of the air of combustion.

It will now be clear that by employing a large excess of carbon in a regular blast furnace, by omitting all iron, and by having present only calcined magnesite, and carbon in the charge, I am enabled to not only fix atmospheric nitrogen in a blast furnace, without the use of electric heat, but I am enabled to continuously tap the fixed nitrogen directly from the reducing zone of the furnace and thus avoid its condensation on the cooler portions of said furnace and on the charge material, a result which has not been heretofore attained in so far as I am aware. The reaction velocities of course are increased by the employment of a hot blast as well as by preheating the charge but neither is essential in all cases to the successful operation of the process. The gas that finally exits from the settlers or scrubbers is found to be a high grade producer gas suitable for use in internal combustion engines and elsewhere.

What I claim is:—

1. The process of producing a magnesium carbonitrid in a blast furnace which consists in charging said furnace with a mixture consisting essentially of magnesium oxid and carbon, said carbon being in sufficient excess to insure a reducing atmosphere at all times during the reaction; heating said charge to a temperature sufficient to produce said carbonitrid, and withdrawing the latter from the region of the reaction zone, substantially as fast as it is formed, substantially as described.

2. The process of producing a magnesium carbonitrid in a blast furnace which consists in charging said furnace with a mixture of calcined magnesite and carbon, said carbon being in sufficient excess to produce a temperature higher than 1500° C. and to insure at all times during the reaction the presence of a reducing atmosphere in the furnace; admitting a regulated air blast to the charge to produce said temperature and to furnish free nitrogen to be fixed; and withdrawing the formed carbonitrid from the region of the fusion zone substantially as fast as it is formed, substantially as described.

3. The process of producing a magnesium carbonitrid in a blast furnace which consists in charging said furnace with a briqueted mixture of calcined magnesite and carbon, said carbon being in sufficient excess to produce a temperature higher than 1500° C. and to insure at all times during the reaction the presence of a reducing atmosphere in the furnace; adding fluxing material to the charge; admitting a regulated hot air blast to the charge to produce said temperature and to furnish free nitrogen to be fixed; withdrawing the formed carbonitrid from the region of the fusion zone substantially as fast as it is formed, and cooling the recovered carbonitrid out of contact with the air, substantially as described.

In testimony whereof I affix my signature.

EDWARD W. HASLUP.